United States Patent [19]

Adam

[11] Patent Number: 5,352,247
[45] Date of Patent: Oct. 4, 1994

[54] ANTHRAQUINONE DYES, THEIR PREPARATION AND THEIR USE

[75] Inventor: Jean-Marie Adam, Rosenau, France

[73] Assignee: Ciba-Geigy Corporation, Ardsley, N.Y.

[21] Appl. No.: 159,408

[22] Filed: Nov. 30, 1993

[30] Foreign Application Priority Data

Dec. 3, 1992 [CH] Switzerland .......................... 3718/92

[51] Int. Cl.$^5$ ........................ C09B 1/20; C09B 43/00; C09B 62/00; D06P 1/20
[52] U.S. Cl. ............................................ 8/676; 8/675; 8/677; 552/224; 552/235; 552/240; 552/248; 552/249; 552/258; 552/260; 544/187; 544/188; 544/189; 534/643; 546/74
[58] Field of Search ................ 8/676, 675, 677, 643, 8/924; 552/224, 226, 230, 235, 236, 240, 244, 248, 249, 258, 260; 546/74, 1–11, 13; 534/643, 591; 544/187, 188, 189

[56] References Cited

U.S. PATENT DOCUMENTS

| | | | |
|---|---|---|---|
| 3,431,285 | 3/1969 | Schwander | 260/371 |
| 3,591,610 | 7/1971 | Remmochi | 260/372 |
| 4,426,328 | 1/1984 | Adam | 260/162 |
| 4,676,803 | 6/1987 | Harms et al. | 8/532 |
| 4,693,727 | 9/1987 | Bowles et al. | 8/549 |
| 4,925,928 | 5/1990 | Tzikas | 534/618 |
| 4,992,569 | 2/1991 | Adam | 552/287 |
| 5,023,326 | 6/1991 | Tzikas et al. | 534/638 |
| 5,116,957 | 5/1992 | Jager | 534/632 |
| 5,232,462 | 8/1993 | Tzikas | 8/549 |

FOREIGN PATENT DOCUMENTS

| | | |
|---|---|---|
| 0181293 | 5/1986 | European Pat. Off. . |
| 1470510 | 1/1967 | France . |
| 903590 | 8/1962 | United Kingdom . |
| 1048316 | 11/1966 | United Kingdom . |
| 1122778 | 8/1968 | United Kingdom . |
| 1438354 | 6/1976 | United Kingdom . |

Primary Examiner—Arthur C. Prescott
Attorney, Agent, or Firm—Kevin T. Mansfield

[57] ABSTRACT

Anthraquinone dyes of the formula

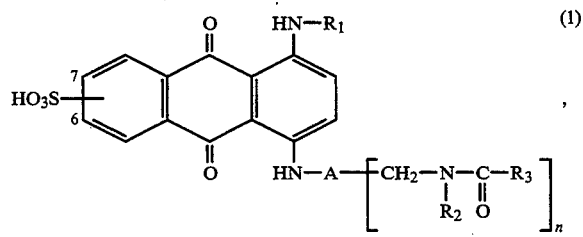

in which A, $R_1$, $R_2$, $R_3$ and n are as defined in claim 1, produce dyeings having good fastness properties on nitrogen-containing or hydroxyl-containing fibre materials.

15 Claims, No Drawings

ANTHRAQUINONE DYES, THEIR PREPARATION AND THEIR USE

The present invention relates to novel anthraquinone dyes, processes for their preparation and the use of these dyes for dyeing and printing fibre materials, in particular textile fibre materials.

The present invention provides anthraquinone dyes of the formula

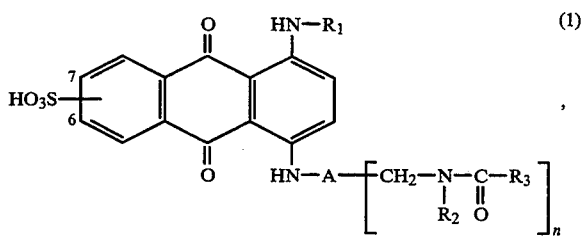

in which $R_1$ is substituted or unsubstituted $C_5$-$C_8$cycloalkyl or a radical of the formula

R' and R", independently of one another, being a $C_1$-$C_4$alkyl radical, $R_2$ is hydrogen or $C_1$-$C_4$alkyl, $R_3$ is unsubstituted or halogen-substituted $C_1$-$C_4$alkyl or $C_2$-$C_4$alkenyl, or is substituted or unsubstituted phenyl, or in which the radical of the formula

is a radical of the formula

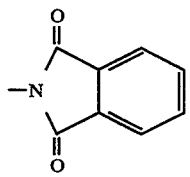

which is unsubstituted or substituted on the phenyl ring,

A is an aromatic bridging member, and n is 1,2 or 3, the sulfo group in the dye of the formula (1) being attached to the position designated as 6 or 7.

$R_1$ as $C_5$-$C_8$cycloalkyl is preferably cyclopentyl, cyclohexyl and cycloheptyl, in particular cyclohexyl. The cycloalkyl radicals mentioned can be unsubstituted or substituted by $C_1$-$C_4$alkyl, such as methyl, ethyl, propyl, isopropyl, butyl, isobutyl, sec-butyl or tert-butyl, in particular methyl or ethyl. $R_1$ as $C_5$-$C_8$cycloalkyl is preferably unsubstituted or $C_1$-$C_4$alkyl-substituted cyclohexyl, in particular unsubstituted cyclohexyl.

$R_2$, R' and R" as $C_1$-$C_4$alkyl are preferably, independently of one another, methyl, ethyl, propyl, isopropyl, butyl, isobutyl, sec-butyl or tert-butyl.

$R_3$ as unsubstituted or halogen-substituted $C_1$-$C_4$alkyl or $C_2$-$C_4$alkenyl is in particular methyl, ethyl or vinyl. The radicals mentioned can be unsubstituted or substituted, for example, by chlorine or bromine. Examples include $-CH_2Cl$, $-CH=CH_2$, $-CHBr-CH_2Br$ and

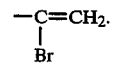

The radical $R_3$ as phenyl can be substituted or unsubstituted. Examples of possible substituents include $C_1$-$C_4$alkyl, for example methyl or ethyl, $C_1$-$C_4$alkoxy, for example methoxy or ethoxy, $C_2$-$C_4$alkanoylamino, for example acetylamino or propionylamino, or halogen, for example chlorine or bromine.

In the case where the radical of the formula

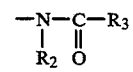

is a radical of the formula

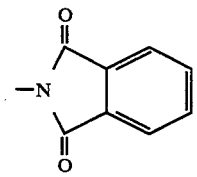

this radical can be unsubstituted on the phenyl ring or substituted as shown above for $R_3$ as phenyl.

The aromatic bridging member A is preferably phenylene or phenyleneoxyphenylene, it being possible for these radicals to be substituted on the phenyl rings as shown above for $R_3$ as phenyl. Preferably, the radicals mentioned as examples of A are unsubstituted or $C_1$-$C_4$alkyl-substituted.

Preference is given to anthraquinone dyes in which $R_1$ is unsubstituted or $C_1$-$C_4$alkyl-substituted cyclohexyl or a radical of the formula

R' and R", independently of one another, being a $C_1$-$C_4$alkyl radical. Particularly preferably, $R_1$ is unsubstituted or $C_1$-$C_4$alkyl-substituted cyclohexyl, isopropyl, isobutyl or sec-butyl, in particular isobutyl or cyclohexyl.

Preference is also given to anthraquinone dyes in which $R_2$ is hydrogen, methyl or ethyl, in particular hydrogen.

Furthermore, preference is given to anthraquinones dyes in which $R_3$ is unsubstituted or $C_1$-$C_4$alkyl-, $C_1$-$C_4$alkoxy-, $C_2$-$C_4$alkanoylamino- or halogen-substituted phenyl or unsubstituted or chlorine- or bromine-substituted methyl, ethyl or vinyl. Particularly preferably, $R_3$ is phenyl or a radical of the formula $-CH_2Cl$, $-CH=CH_2$, $-CHBr-CH_2Br$ or

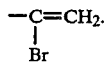

For n, the value 1 or 2, in particular 1, is preferred.

Particular preference is given to anthraquinone dyes in which R₁ is unsubstituted or C₁–C₄alkyl-substituted cyclohexyl or a radical of the formula

R' and R", independently of one another, being a C₁–C₄alkyl radical, R₂ is hydrogen, methyl or ethyl, R₃ is unsubstituted or C₁–C₄alkyl-, C₁–C₄alkoxy-, C₂–C₄alkanoylamino- or halogen-substituted phenyl or unsubstituted or chlorine- or bromine-substituted methyl, ethyl or vinyl, A is unsubstituted or C₁–C₄alkyl-, C₁–C₄alkoxy-, C₂–C₄alkanoylamino- or halogen-substituted phenylene or phenyleneoxyphenylene, and n is 1 or 2.

Very particular preference is given to anthraquinone dyes in which R₁ is isopropyl or cyclohexyl, R₂ is hydrogen, R₃ is phenyl or a radical of the formula —CH₂Cl, —CH=CH₂, —CHBr—CH₂Br or

A is unsubstituted or C₁–C₄alkyl-substituted phenylene or phenyleneoxyphenylene, and n is 1 or 2.

The present invention also provides mixtures of anthraquinone dyes comprising a dye of the formula

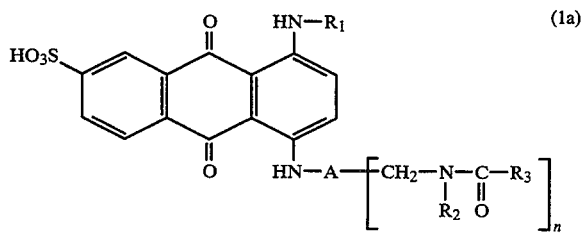

together with a dye of the formula

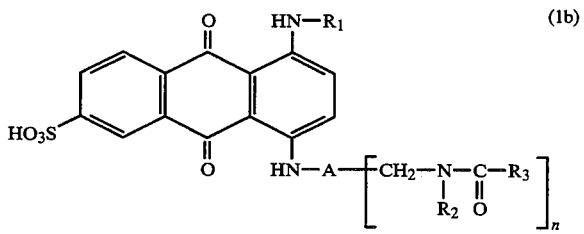

in which A, R₁, R₂, R₃ and n have the abovementioned meanings and preferences.

These are mixtures of isomers in which the individual isomers only differ with respect to the position of the sulfo group.

The present invention also provides a process for preparing the anthraquinone dyes according to the invention, which comprises reacting a compound of the formula

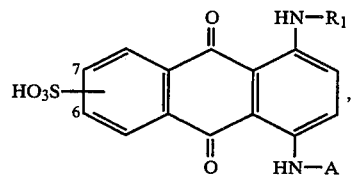

in which R₁ and A are as defined in formula (1), with a compound of the formula

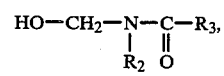

in which R₂ and R₃ are as defined in formula (1).

The reaction is preferably carried out in sulfuric acid, in particular in almost 100% sulfuric acid, at a temperature of, for example, 0° to 40° C.

In the process according to the invention for preparing anthraquinone dyes of the formula (1), the radicals A and R₁ of the compound of the formula (2) and the radicals R₂ and R₃ of the compound of the formula (3) have the abovementioned meanings and preferences. The compounds of the formulae (2) and (3) are known or can be prepared analogously to known compounds. Thus, compounds of the formula (2) can be obtained, for example, by the method described in GB-A-1,438,354.

The intermediates of the formula (2) are prepared without using mercury.

The intermediates of the formula (2) are frequently used as mixtures of isomers in which the individual isomers only differ in the position of the sulfo group, so that in these cases the dyes obtained are also present as mixtures of isomers.

The anthraquinone dyes of the formula (1) according to the invention are present either in the form of their free acid or, preferably, as their salts. Examples of suitable salts are the alkali metal salts, alkaline earth metal salts or ammonium salts or the salts of an organic amine. Examples include the sodium salts, lithium salts, potassium salts or ammonium salts, or the salt of mono-, di- or triethanolamine.

The anthraquinone dyes of the formula (1) according to the invention can be used for dyeing or printing by the customary dyeing or printing methods. The dyeing liquors or printing pastes can contain, apart from water and dyes, further additives, for example wetting agents, antifoams, levelling agents or agents influencing the property of the textile material, for example softeners, additives for flameproof finishing or soil-, water- or oil-repellent agents, and water softeners and natural or synthetic thickeners, for example alginates and cellulose ethers.

The anthraquinone dyes of the formula (1) are suitable for dyeing or printing of nitrogen-containing or hydroxyl-containing fibre materials, in particular of natural polyamide fibre materials, for example wool, and of synthetic polyamide fibre materials, for example nylon 6 or nylon 6.6, and are suitable for dyeing or printing of blend fabrics or blend yarns of wool and synthetic polyamide. The textile material mentioned can be present in a wide range of processing forms, for example as fibre, yarn, woven fabric or knitted fabric.

The anthraquinone dyes of the formula (1) according to the invention produce level dyeings having good general fastness properties, in particular good rub, wet, wet-rub and light fastness properties. Furthermore, they are distinguished by uniform colour build-up, good affinity and good compatibility with other dyes.

In the examples which follow, parts are by weight. Temperatures are degrees Celsius, parts by weight relate to parts by volume as the gram relates to the cubic centimeter.

EXAMPLE 1

98 parts of the compound of the formula

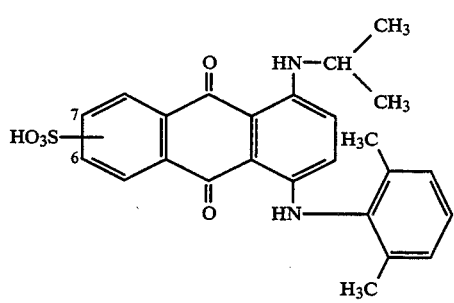
(101)

shown in the form of the free acid are dissolved at a temperature of 20° C. in 500 parts of (100%) sulfuric acid, and 29 parts of N-hydroxymethylchloroacetamide are added. The reaction mixture is additionally stirred at a temperature of 25° C. for 24 hours and then poured onto ice, resulting in precipitation of the dye of the formula

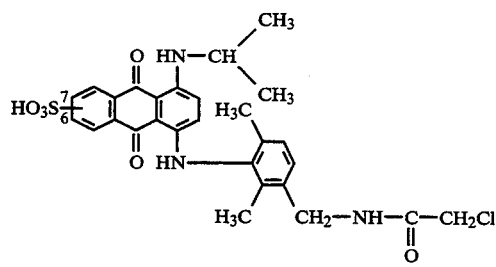
(102)

shown in the form of the free acid. The dye of the formula (102) thus obtained dyes wool and synthetic polyamide fibre material in brilliant blue shades. The dyeings exhibit good lightfastness and wet fastness properties.

EXAMPLES 2 to 15

Example 1 is repeated, except that the 98 parts of the compound of the formula (101) are replaced by an equimolar amount of the compound of the formula

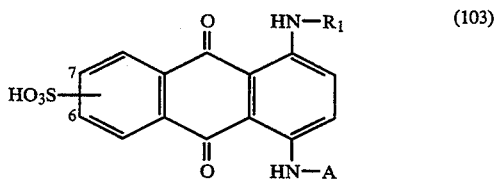
(103)

shown in the form of the free acid and the 29 parts of N-hydroxymethylchloroacetamide are replaced by an equimolar amount of a compound of the formula

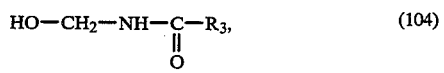
(104)

to give the dyes shown in column 2 of the table below in the form of the free acid, which dyes dye wool and synthetic polyamide fibre material in the shades shown in column 3. The meanings of the radicals A, $R_1$ and $R_3$ of the compounds of the formulae (103) and (104) can be seen from the dyes listed in the table below, which in a general form correspond to the compound of the formula

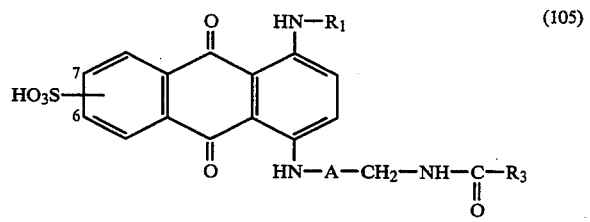
(105)

TABLE

| Ex. | Dye | Shade |
|---|---|---|
| 2 | ![dye structure] | blue |

5,352,247
TABLE-continued
| Ex. | Dye | Shade |
|---|---|---|
| 3 | 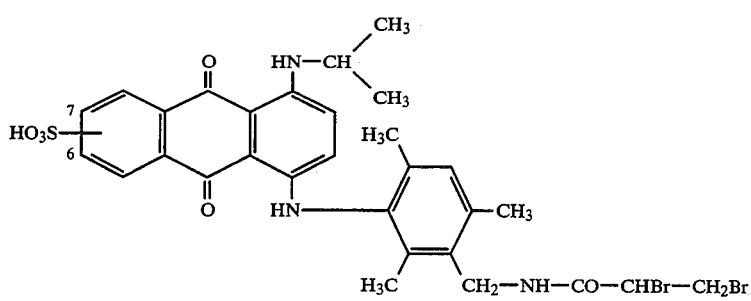 | blue |
| 4 | 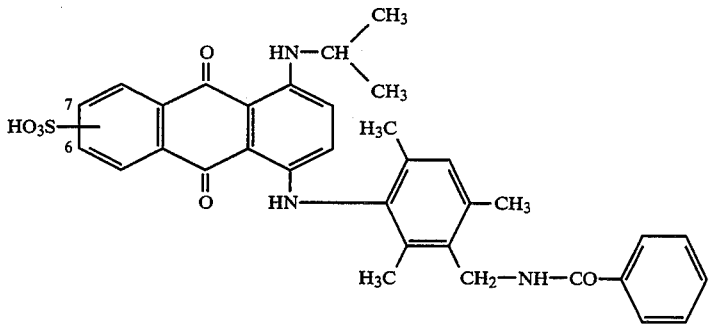 | blue |
| 5 | 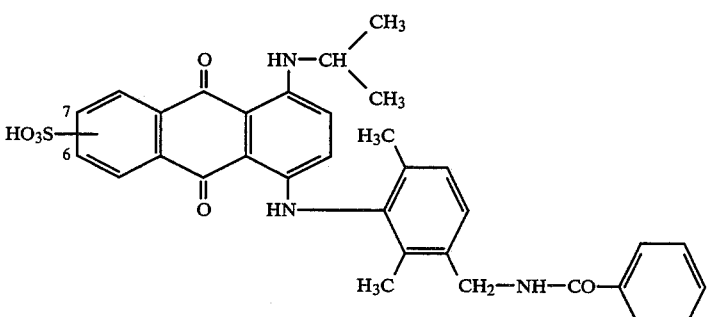 | blue |
| 6 | 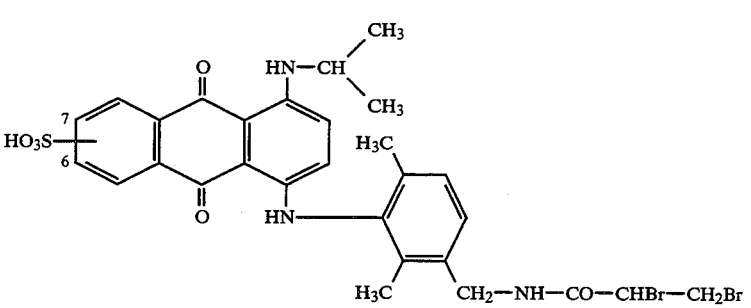 | blue |
| 7 | 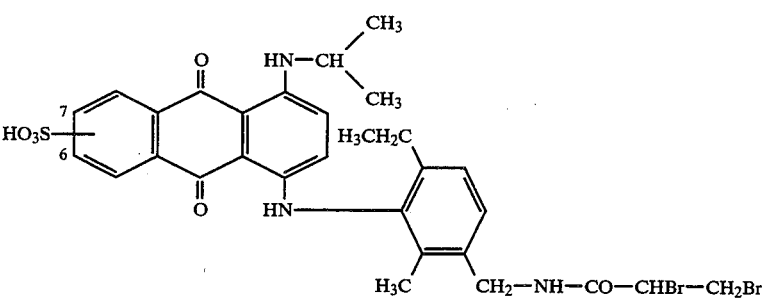 | blue |

| Ex. | Dye | Shade |
|---|---|---|
| 8 | | blue |
| 9 | | blue |
| 10 | | blue |
| 11 | | blue |
| 12 | | blue |
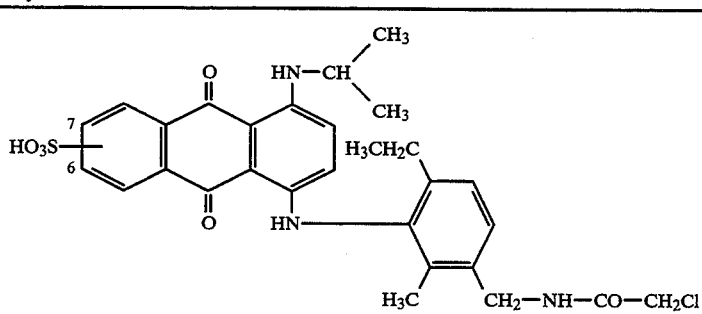

TABLE-continued

| Ex. | Dye | Shade |
|---|---|---|
| 13 | | green-blue |
| 14 | | green-blue |
| 15 | | green-blue |

EXAMPLE 16

Example 1 is repeated, except that 58 parts of N-hydroxymethylchloroacetamide are used instead of 29 parts of N-hydroxymethylchloroacetamide, to give the dye of the formula

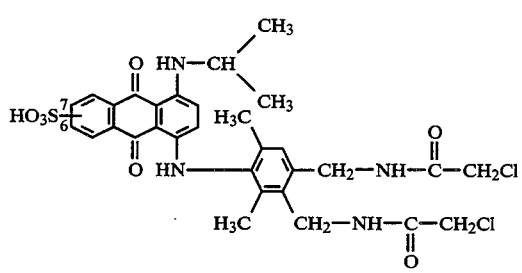

(106)

shown in the form of the free acid.

The dye of the formula (106) thus obtained dyes wool and synthetic polyamide fibre material in blue shades. The dyeings have good lightfastness and wet fastness properties.

Each of the starting compounds of the formulae (101), (103) and (105) employed in the above Examples 1 to 16 is used as a mixture of isomers (the isomers only differ with respect to the sulfo group attached to the 6- or 7-position, the ratio of isomers being 1:1), as a result of which the dye end products are also obtained as the corresponding mixtures of isomers. If the individual, unmixed isomers are used in Examples 1 to 16 instead of a mixture of isomers of the starting materials, the corresponding dyes are also obtained as individual dyes.

EXAMPLES 17 and 18

Example 1 was repeated, replacing the 29 parts of N-hydroxymethylchloroacetamide by an equimolar amount of a compound of the formula

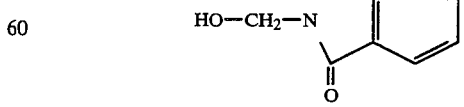

to give the dyes of the formulae

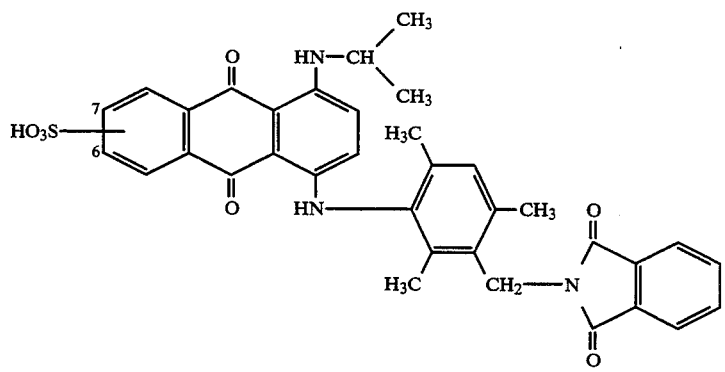

and

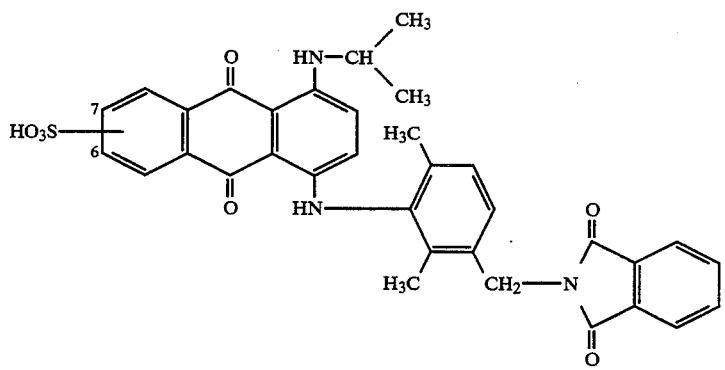

The dyes shown dye wool and synthetic polyamide fibre material in blue shades.

Dyeing procedure I 10 parts of a nylon-6.6 fabric are dyed in 500 parts of an aqueous liquor which contains 2 g/l of ammonium acetate and is brought to a pH of 5 with acetic acid. The amount of dye according to Example 1 is 0.7%, relative to the fibre weight. The dyeing time at a temperature of 98° C. is 30 to 90 minutes. The dyed nylon-6.6 fabric is then removed and washed and dried as usual.

This gives a blue-dyed nylon-6.6 fabric exhibiting good overall fastness properties.

Dyeing procedure II 10 parts of a nylon-6.6 fabric are dyed in 500 parts of an aqueous liquor which contains 1 g/l of monosodium phosphate and is brought to a pH of 6 with disodium phosphate. The amount of dye according to Example 1 is 1%, relative to the fibre weight. The dyeing time at a temperature of 98° C. is 30 to 90 minutes. The dyed nylon-6.6 fabric is then removed and washed and dried as usual.

Dyeing procedure III 10 parts of a woollen material are dyed in 500 parts of an aqueous liquor. Based on the fibre weight, the amounts of the dye according to Example 1, of calc. Glauber's salt and 80% acetic acid are 0.45%, 5% and 2%, respectively. The dyeing time at a temperature of 98° C. is 30-60 minutes. The blue-dyed woollen material washed and dried as usual exhibits good overall fastness properties.

What is claimed is:

1. An anthraquinone dye of the formula

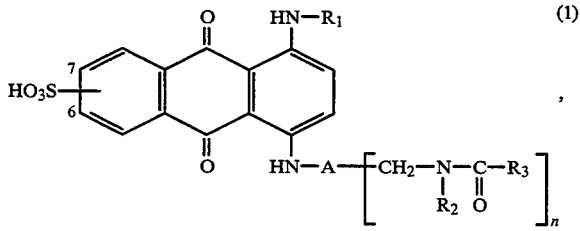

in which
$R_1$ is substituted or unsubstituted $C_5$–$C_8$cycloalkyl or a radical of the formula

$R'$ and $R''$, independently of one another, being a $C_1$–$C_4$alkyl radical,
$R_2$ is hydrogen or $C_1$–$C_4$alkyl,
$R_3$ is unsubstituted or halogen-substituted $C_1$–$C_4$alkyl or $C_2$–$C_4$alkenyl, or is substituted or unsubstituted phenyl, or in which the radical of the formula

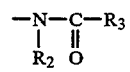

is a radical of the formula

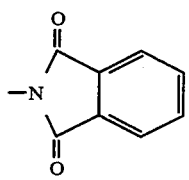

which is unsubstituted or substituted on the phenyl ring,

A is an aromatic bridging member, and n is 1, 2 or 3, the sulfo group in the dye of the formula (1) being attached to the position designated as 6 or 7.

2. An anthraquinone dye according to claim 1, wherein $R_1$ is unsubstituted or $C_1$-$C_4$alkyl-substituted cyclohexyl or a radical of the formula

R' and R'', independently of one another, being a $C_1$-$C_4$alkyl radical.

3. An anthraquinone dye according to claim 1, wherein $R_1$ is isopropyl or cyclohexyl.

4. An anthraquinone dye according to claim 1, wherein $R_2$ is hydrogen, methyl or ethyl.

5. An anthraquinone dye according to claim 1, wherein $R_2$ is hydrogen.

6. An anthraquinone dye according to claim 1, wherein $R_3$ is unsubstituted or $C_1$-$C_4$alkyl-, $C_1$-$C_4$alkoxy-, $C_2$-$C_4$alkanoylamino- or halogen-substituted phenyl or unsubstituted or chlorine- or bromine-substituted methyl, ethyl or vinyl.

7. An anthraquinone dye according to claim 1, wherein $R_3$ is phenyl or a radical of the formula —CH$_2$Cl, —CH=CH$_2$, —CHBr—CH$_2$Br or

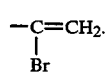

8. An anthraquinone dye according to claim 1, wherein A is unsubstituted or $C_1$-$C_4$alkyl-, $C_1$-$C_4$alkoxy-, $C_2$-$C_4$alkanoylamino- or halogen-substituted phenylene or phenyleneoxyphenylene.

9. An anthraquinone dye according to claim 1, wherein n is 1 or 2.

10. An anthraquinone dye according to claim 1, wherein $R_1$ is unsubstituted or $C_1$-$C_4$alkyl-substituted cyclohexyl or a radical of the formula

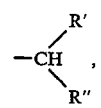

R' and R'', independently of one another, being a $C_1$-$C_4$alkyl radical, $R_2$ is hydrogen, methyl or ethyl, $R_3$ is unsubstituted or $C_1$-$C_4$alkyl-, $C_1$-$C_4$alkoxy-, $C_2$-$C_4$alkanoylamino- or halogen-substituted phenyl or unsubstituted or chlorine- or bromine-substituted methyl, ethyl or vinyl, A is unsubstituted or $C_1$-$C_4$alkyl-, $C_1$-$C_4$alkoxy-, $C_2$-$C_4$alkanoylamino- or halogen-substituted phenylene or phenyleneoxyphenylene, and n is 1 or 2.

11. An anthraquinone dye according to claim 10, wherein $R_1$ is isopropyl or cyclohexyl, $R_2$ is hydrogen, $R_3$ is phenyl or a radical of the formula —CH$_2$Cl, —CH=CH$_2$, —CHBr—CH$_2$Br or

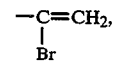

A is unsubstituted or $C_1$-$C_4$alkyl-substituted phenylene or phenyleneoxyphenylene, and n is 1 or 2.

12. A mixture of anthraquinone dyes according to claim 1, which comprises a dye of the formula

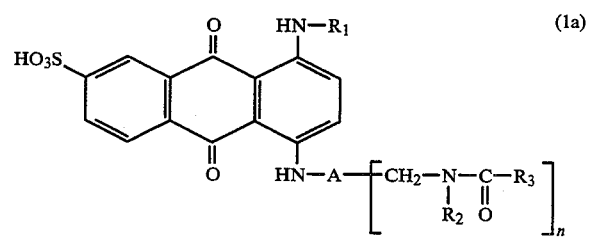

together with a dye of the formula

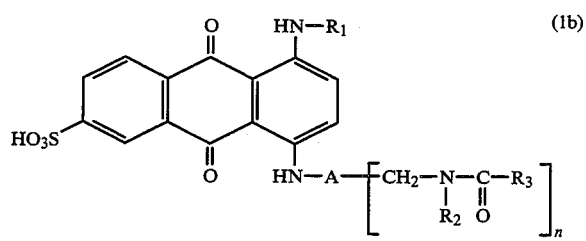

in which A, $R_1$, $R_2$, $R_3$ and n are as defined in claim 1.

13. A process for preparing an anthraquinone dye according to claim 1, which comprises reacting a compound of the formula

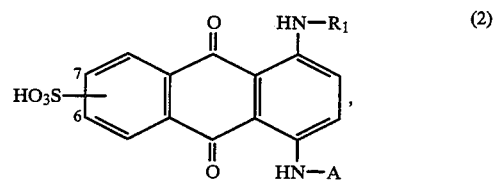

in which $R_1$ and A are as defined in claim 1, with a compound of the formula

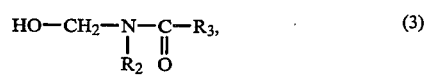

in which $R_2$ and $R_3$ are as defined in claim 1.

14. A process for dyeing or printing nitrogen-containing or hydroxyl-containing fibre material which comprises the step of applying to said fibre material a tinctorial amount of an anthraquinone dye according to claim 1.

15. A process according to claim 14 wherein said fibre material is natural or synthetic polyamide fibre material.

* * * * *